US006629139B1

(12) United States Patent
Kennedy

(10) Patent No.: US 6,629,139 B1
(45) Date of Patent: Sep. 30, 2003

(54) REACTIVE DETECTION OF CONDITIONS OF INTEREST IN DISTRIBUTED SYSTEMS

(75) Inventor: Thomas A. Kennedy, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/388,397

(22) Filed: Sep. 1, 1999

(51) Int. Cl.[7] .......................................... G06F 15/173
(52) U.S. Cl. ........................................ 709/224; 709/223
(58) Field of Search ............................... 709/224, 223; 707/1, 10; 340/500

(56) References Cited

U.S. PATENT DOCUMENTS

| | | | | |
|---|---|---|---|---|
| 4,821,178 A | * | 4/1989 | Levin et al. ................. | 714/47 |
| 5,475,597 A | * | 12/1995 | Buck ........................... | 455/456 |
| 5,689,442 A | * | 11/1997 | Swanson et al. ............ | 380/241 |
| 6,029,175 A | * | 2/2000 | Chow et al. ................. | 707/104 |
| 6,061,430 A | * | 5/2000 | Miller et al. ................. | 379/49 |
| 6,065,009 A | * | 5/2000 | Leymann et al. ............. | 707/10 |
| 6,256,775 B1 | * | 7/2001 | Flynn ........................... | 717/4 |

* cited by examiner

*Primary Examiner*—Frantz B. Jean
(74) *Attorney, Agent, or Firm*—Leslie A. Van Leeuwen; Bracewell & Patterson, L.L.P.

(57) ABSTRACT

A method for detecting conditions of interest in a distributed system. First, a condition of interest is formulated as a Boolean statement and stored at a condition detection component of the distributed system. The condition detection component then selectively receives events related to the condition of interest from a data collection component. Finally, the received events are combined and evaluated against the Boolean statement to determine if the condition is met. In one embodiment, the condition also includes a WITHIN element which filters out events received outside of a pre-specified time period.

31 Claims, 5 Drawing Sheets

REACTIVE DETECTION OF CONDITIONS OF INTEREST IN DISTRIBUTED SYSTEMS

BACKGROUND OF THE INVENTION

1. Technical Field

The present invention relates in general to distributed systems, and in particular to a method and system for determining conditions of interest on distributed systems. Still more particularly, the present invention relates to a method and system for automated determination of conditions of interest on distributed systems.

2. Description of the Related Art

A distributed system is a type of network with a number of separate individual components. In a distributed system the components are typically input/output locations which are connected to each other or to a common central server. A local area network (LAN) is an example of a distributed system having computer terminals connected to a server which is typically a data processing system. Those skilled in the art understand that many other forms of distributed systems exists which may be similar to or different from the traditional LAN.

Detection of conditions of interest within a distributed system is one of the primary tasks of a system monitoring/management application. The architecture of most of these applications utilizes data collection components at various nodes that gather information. These components package the information as events, then sends them to regional monitoring components. The monitoring components are programmed with criteria based on the event information, which detect conditions of interest in the system. Often times, when a condition of interest is detected, an appropriate set of actions are performed. For example, the condition of interest may include detecting a hack attack on the system. The events which indicate a hack attack are logged and the system or system administrator undertakes some reactive measure. Thus, since the monitoring components are waiting for events, the monitoring components are reactive in nature.

A distributed system is comprised of a set of networked nodes. On many of these nodes, data collection components gather information of interest about the system. Some of this information is used to diagnose system problems. Often times, system-wide problem diagnosis depends upon information generated from multiple nodes in the system. In this case, the information must be accessible in a central location for analysis since comparison of data must occur at the same node. Once collected, the information is sent to this central location for system-wide analysis. Here, a set of criteria that specifies conditions of interest is computed against the information received from the nodes in the system. If a match occurs, a condition of interest has been detected.

Conditions of interest can be time-dependent. For example, if a data item had a certain value yesterday that met part of the criteria for a condition of interest, but has a new value today that does not, yesterday's data is irrelevant and is not considered for today's condition detection. A time window is used for eliminating this prior information. So, for time-dependent criteria, a time window is specified as part of the criteria.

For clarity, the central location is referred to as the condition detection component throughout this disclosure. Also, the information transport mechanism is assumed to be via events sent from the data collection components to the condition detection component. This assumption is made to facilitate integration between the new condition detection model and the current or prior event monitoring system architectures since most use events as the event transport mechanisms.

FIG. 1 depicts a basic distributed condition detection system with three nodes, node1 107, node2 109, and node3 101. Node1 107 and node2 109 contain data collection components. On model 107, there are two instances of object type A 111 and 113 and one instance of object type B 115. On node2 109, there is one instance of object types A 111, object type C 117 and object type D 119, respectively. An object type may be any hardware resource, such as a central processing unit (CPU), or router. Object types may also be software applications modelled as an object or user. Node 3 101 contains the condition detection component 105. As can be seen, all data collection components send their information to the condition detection component 105. Here, a set of condition criteria 103 is computed against the data received from the collection components to detect conditions of interest.

The conventional approach to system wide condition detection is centered around event processing. Data is generated at distributed nodes, then formatted as events and sent to the condition detection component as previously described. The received event is now referred to as the event under analysis. When the event is received by the condition detection component, it is processed by a sequence of event filters. Each event filter is based on the event type. That is, a filter written for an event of type A (i.e., A1, A2. . . AN) will fire when the event under analysis is of type A. Also, a given filter may also fire on multiple event types. Each event filter may have an associated attribute filter. If the event passes the event filter, the attribute filter is tested. If the attributes in the event under analysis match the criteria in the event, the rule fires. When a rule fires, appropriate actions are performed. An example of a rule is an equation such as A>B, while an event is a change of an attribute in the object. An attribute is a CPU threshold data in the object. After, the event under analysis is processed by all event filters, it is added to an event cache. This cache stores the time/history for the information gathered from the collection components. FIG. 2 depicts the conventional condition detection approach.

The basic makeup and components of FIG. 2 are similar to and described within FIG. 1; however, in FIG. 2, event filters 108 of the condition detection component 106 are illustrated. Whenever a new event is received by the condition detection component 106, a condition of interest may have occurred within the system. The first step for determining if a condition of interest has occurred is to process the received event through the event/attribute filters 108. If a rule fires, some part of the complex condition has been detected. The remaining part of the condition must be evaluated. This is accomplished by searching the event cache for events that satisfy event type and attribute value criteria. If multiple event types are involved in the condition, multiple searches need to be performed.

As an example of the current art, assume a condition of interest as follows:

(A.val>5 and C.val>4 ) and (A.node equal C.node)

This condition says that a condition of interest has occurred when events of type A and C are received from the same node and that event A's attribute value is greater than 5 and that event C's attribute value is greater than 4. For this condition to be detected the following criteria must be specified.

```
//If an A is received
WHEN event of A received
    IF(A.val>5) THEN
        C=Cache.search(C, where C.node equals A.node)
        If(not empty(C) THEN
            If(C.val>4) THEN
                *ConditiOn detected*
            END
        END
    END
//If an C is received
WHEN event of C received
    IF(C.val>4) THEN
        A=Cache.search(A, where C.node equals A.node)
        If(not empty(A) THEN
            If(A.val>5) THEN
                *Condition detected*
            END
        END
    END
```

Thus, to detect the subject condition for related events, two criteria must be specified, one for each event type received. Then, each action must perform a cache search for its related event. Inspection of the original problem shows the original concisely stated problem must be transformed to the event processing paradigm in order to detect the condition of interest. Hence, some degree of understanding of the underlying condition detection architecture is required to formulate the desired condition to detect. Furthermore, this conventional solution is much more difficult to understand than the original problem statement. The intent of the condition in the original problem is easily understood by simply reading the statement. However, an analysis of the conventional specification is required to understand the meaning of conventional representation of the condition. The above example is relatively simple in nature. When more types are added to the condition, a permutation of event filters can occur (depending on the condition). This may cause the condition formulation to become rather lengthy, and thus more difficult to understand.

Another problem encountered by many distributed systems occurs when the system is comprised of computers from different manufacturers. This complicates the task of getting computers to work together efficiently. Computers in these "multi-vendor" distributed systems are usually difficult to operate together because they do not use common data-formats or common security mechanisms. The lack of a common network naming scheme also limits the degree to which computers can share information.

The present invention thus recognizes that it would therefore be advantageous to have an automated method and system for efficiently detecting conditions of interest in distributed systems. It would also be advantageous if such a method and system did not require knowledge of the underlying condition detection architecture.

SUMMARY OF THE INVENTION

It is therefore one object of the present invention to provide an improved method and system for distributed systems.

It is another object of the present invention to provide a method and system for determining conditions of interest in distributed systems.

It is yet another object of the present invention to provide an efficient, automated method and system for determining conditions of interest in distributed systems.

The foregoing objects are achieved as is now described. A method is disclosed for detecting conditions of interest in a distributed system. First, a condition of interest is formulated as a Boolean statement and stored at a condition detection component of the distributed system. The condition detection component then selectively receives events related to the condition of interest from a data collection component. Finally, the received events are combined and evaluated against the Boolean statement to determine if the condition is met. In one embodiment, the condition also includes a WITHIN element which filters out events received outside of a pre-specified time period.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
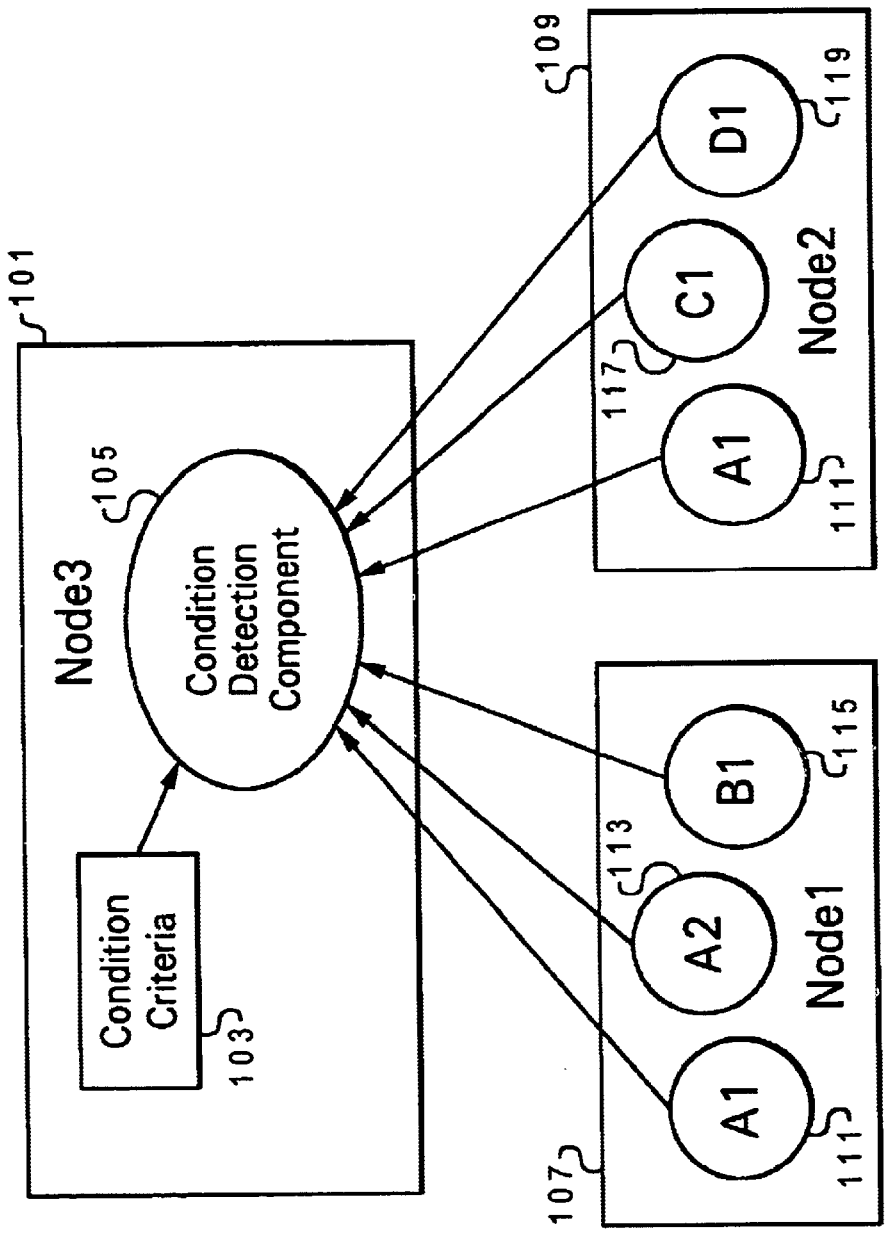
FIG. 1 illustrates a distributed system according to the prior art.
Figure 2:
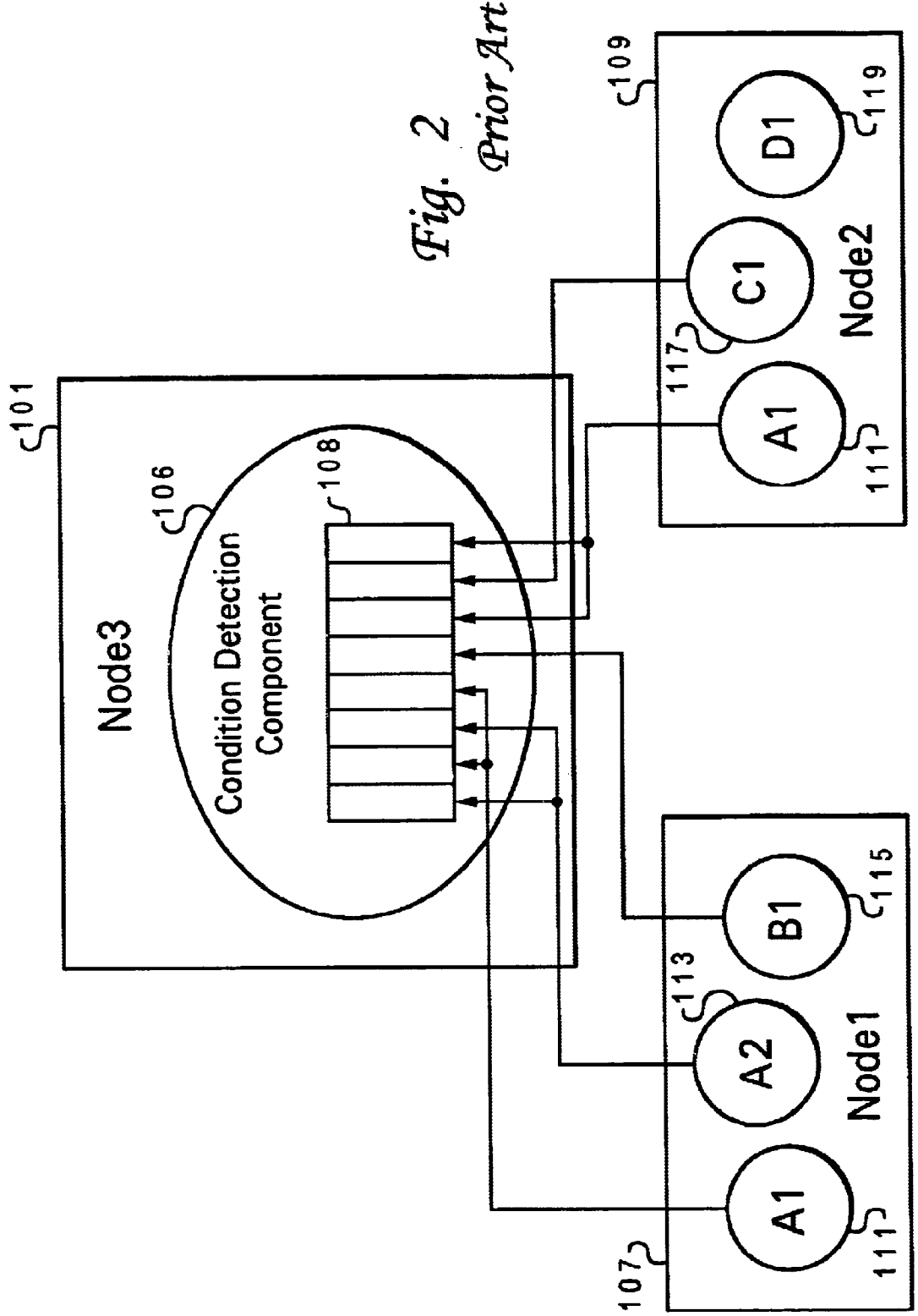
FIG. 2 illustrates the distributed system of FIG. 1 with event filters in the condition detection component according to the prior art.
Figure 3:
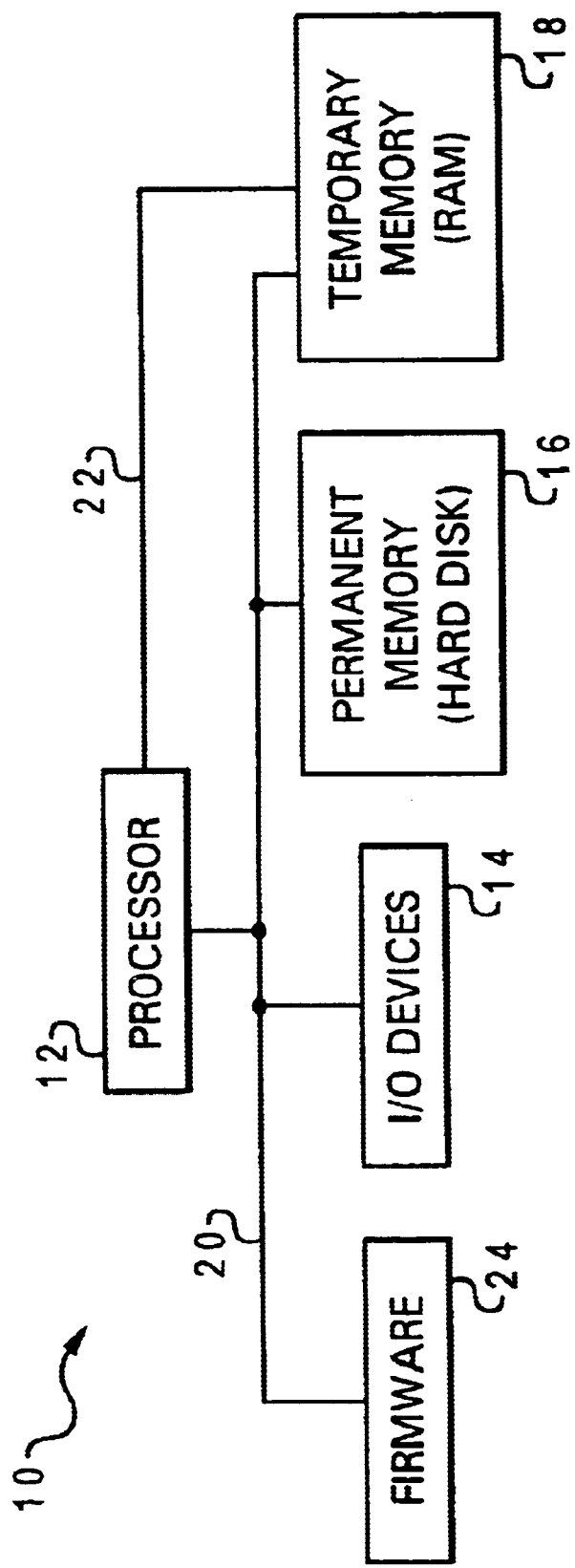
FIG. 3 is a block diagram representation of the internal components of a data processing system utilized within one embodiment of the present invention.

With reference now to the figures, and in particular with reference to FIG. 3, there is depicted the basic structure of a data processing system 10 utilized in the preferred embodiment of the invention. Data processing system 10 has at least one central processing unit (CPU) or processor 12 which is connected to several peripheral devices, including input/output devices 14 (such as a display monitor, keyboard, and graphical pointing device) for user interface, a permanent memory device 16 (such as a hard disk) for storing the data processing system's operating system and user programs/applications, and a temporary memory device 18 (such as random access memory or RAM) that is utilized by processor 12 to implement program instructions. Processor 12 communicates with the peripheral devices by various means, including a bus 20 or a direct channel 22 (more than one bus may be provided utilizing a bus bridge).

Data processing system 10 may have many additional components which are not shown such as serial, parallel, and USB ports for connection to, e.g., modems or printers. In the preferred embodiment of the invention, communication to the data processing system is made possible via a modem connected to a land line or wireless cellular telephone system which is in turn connected to other components to create a network or distributed system. Distributed system may be a wide are network (WAN) such as an Internet. Additionally, the data processing system may be connected to a distributed system via an ethernet/network card. Communicated data arrives at (or is sent through) the modem or network card and is processed to be received by the data processing system's CPU or other software application. In a preferred embodiment, a data processing system operates as a condition detection component for analyzing and recognizing conditions of interest in a distributed system. The data collection components may also.be data processing systems.

The implementation of the present invention preferably occurs on one of data processing system operating as a main node or central location having the condition detection algorithm stored in its memory. It is understood however, that each node may be represented by either a complete data processing system or other types of data entry devices, such as scanners, or sensors, etc. which may require manual input or automatic input upon stimulation.

Those skilled in the art will further appreciate a that there are other components that might be utilized in conjunction with those shown in the block diagram of FIG. 3; for example, a display adapter connected to processor 12 might be utilized to control a video display monitor, and a memory controller may be utilized as an interface between temporary memory device 18 and processor 12. Data processing system 10 also includes firmware 24 whose primary purpose is to seek out and load an operating system from one of the peripherals (usually permanent memory device 16) whenever the data processing system is first turned on. In the preferred embodiment, data processing system 10 contains a relatively fast CPU 12 along with sufficient temporary memory device 18 and space on permanent memory device 16, and other required hardware components necessary for providing quick evaluation of events within a condition detection environment.

The present invention provides a new approach for specifying reactive complex condition detection criteria in a distributed system. The approach utilized in the invention has a more precise means for specifying conditions of interest to detect and thus is easier to learn. The user of the condition detection mechanism of the invention does not require knowledge of the underlying condition detection architecture.

In the preferred embodiment, the distributed system may be a computer network such as a Local Area Network (LAN) having wire connections via a modem or ethernet, etc., or a Wide Area network (WAN) such as the Internet with connections via the Internet. In the various embodiments, the algorithm which controls the invention is stored within one central data processing unit. The condition criteria is also stored in a database of data processing unit and may be adaptable, thus allowing a system manager to update it by adding new condition criteria or deleting old ones. Both algorithm and condition criteria may be stored on hard drive 16 of data processing system 10; Alternatively, they may be stored on a computer readable medium such as a computer disk or removable memory.

The present invention represents the problem states directly in a Boolean statement format, as opposed to converting it to another paradigm. Thus, the user formulates the conditions of interest to detect as a set of Boolean statements. A system manager having access to the condition detection component (data processing system) creates a "rule set" which is entered in a text file capable of providing correct Boolean functions to express the rule. The text file is stored in the memory of the condition detection component.

When the text file is run on the condition detection component, the condition detection component reads the rule set and parses them. The parsed statements are then stored in memory as program code. The condition detection component may be a dedicated system or general system (undedicated). Those skilled in the art are familiar with Boolean programming logic as utilized in computer systems. Any number of event types can be specified in a statement and each may have associated attributes, such as a number value. These event types are interleaved with appropriate operators (including <,>,AND, OR, NOT, . . . , etc.) as necessary to formulate the desired condition. The condition detection component receives events from the data collection component and attempts to evaluate the Boolean statements specified as the condition criteria.

The infrastructure of the distributed system may be homogenous or heterogenous. In a heterogenous structure, the various agents may include, e.g., a NT machine, a Netware machine and a UNIX machine, all connected to the condition detection component. Each machine sends specific events or event types to the condition detection component. The events are parameterized to ensure that they are in the correct format for use by the condition detection component. The parameterizing of the events may occur at the condition detection component or at the individual agents. When the events are received, the operating system (OS) of the condition detection component instantiates (i.e., automatically begins) the iteration of the stored program code which applies to the events to determine if the condition evaluates to "true". In one embodiment, the condition is agent based (i.e., depends on the specific type of agent of the heterogenous system). The events then are provided with an attribute which identifies to which agent they belong. This attribute is utilized in the evaluation of the condition.

Figure 4:
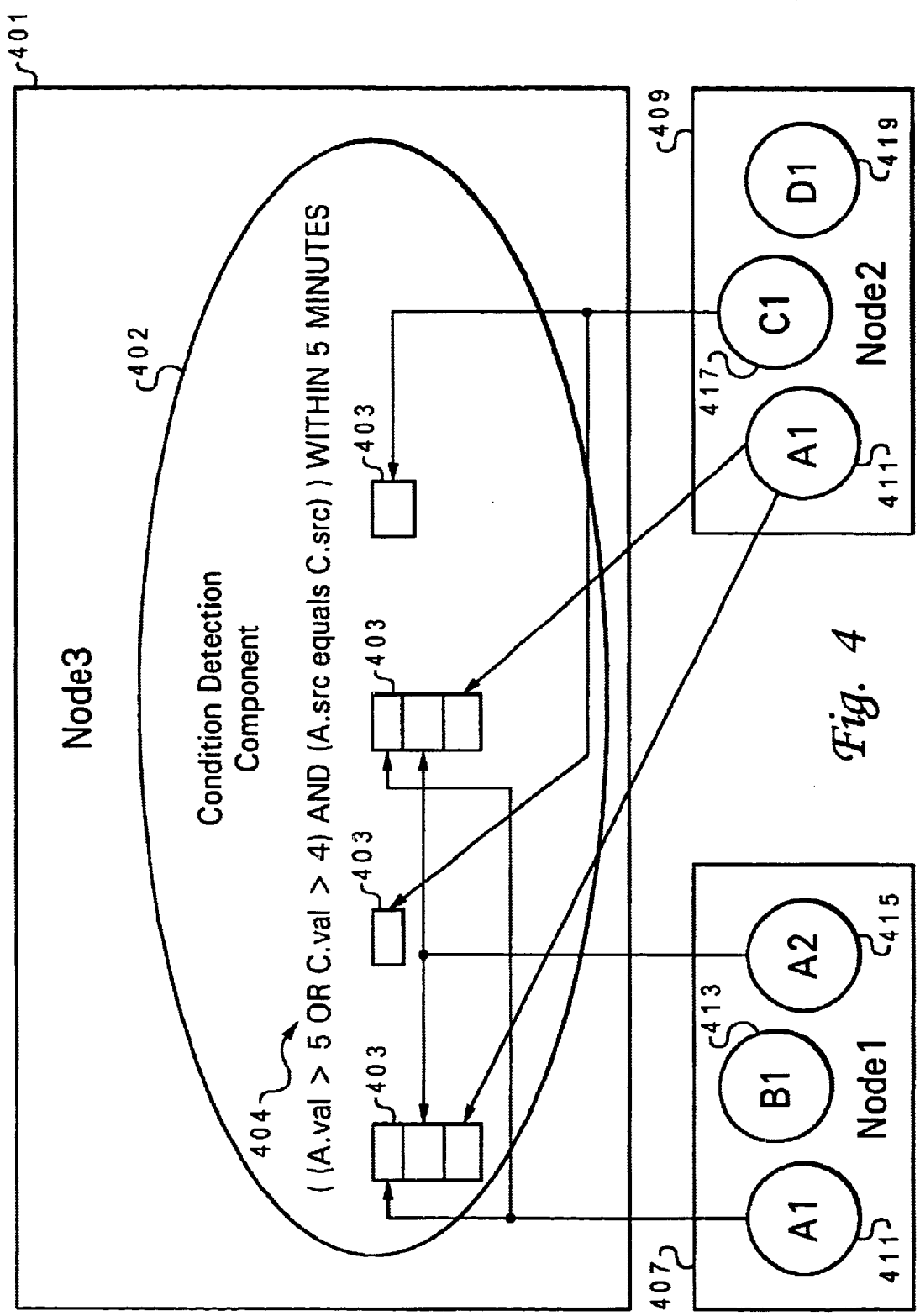
FIG. 4 illustrates a distributed system implementing the condition detection mechanism according to preferred embodiment of the present invention.

FIG. 4 illustrates a condition detection system of the present invention. The basic structure of the condition evaluation scheme of the present invention differs significantly from the conventional cache-based approach. FIG. 4 contains three nodes, model 407, node2 409 and node3 401. Node3 401 hosts the condition detection component 402. Each condition statement 404 is stored in the condition detection component 402 as illustrated. That is, each variable in the condition statement directly references a list of received events 403 of its corresponding event type. The event types are received from model 407 and node2 409. These event types include A1 411, A2 415, B1 413, C1 417, and D1 419 in the illustrative example. In accordance with a preferred embodiment of the invention and the illustrative example, the event types are filtered based on the "WITHIN" window specification appended to the condition statement 404. In this illustrative embodiment, only events received within the last 5 minutes are considered in the evaluation of the equation. Evaluation of the condition is accomplished by systematically substituting each event instance for the parameters in the equation until the Boolean statement is satisfied, or all possible combinations are exhausted. Every combination that evaluates the equation to "true" is a detection of the condition of interest. Conditions of interest can be anything whose occurrence the system manager desires to monitor or be made aware of. These may be faults in the system, levels of activity, breakdown, etc.

An illustrative example of the invention is now presented. This example occurs on a UNIX system. The condition detection component monitors events of the OS of each UNIX machine, specifically, login into the UNIX machine by a user. Whenever a user attempts to login using a Super User (SU) to login to the root and the attempt fails, an event message is created which is captured and sent to the condition detection component, referred to as the server in this illustrative embodiment. In this embodiment, the programmed event may be an occurrence of three consecutive fails during the same login process. This condition may occur during a hack attack on a system (i.e., an attempt to break into/access a system without proper authorization). In this embodiment, the server is programmed with a condition statement which checks for a set number (3) of consecutive failures and acts accordingly.

A comparison of this approach to the conventional approach reveals that the effort required to formulate the event/attribute filters and cache searches are automated using this approach by using knowledge of the composition of the condition expressions. In other words, the user no longer has to formulate searches of the condition elements to determine if the condition exists. The algorithm eliminates the need for the user input after the data is sent to the condition detection system by instantly running through the combination of parameters and determining if the condition is present.

As is illustrated, the fundamental condition detection algorithm is a basic expression evaluator. The performance for such an algorithm can be highly tuned by a user or system administrator. When a condition is met (i.e., evaluates to be true), any number of responses may occur based on the programming of the condition detection component by the system manager. The condition detection component may do nothing but store the time of the occurrence, or it may produce a visual output such as a light or a text message on a graphical user interface or connected printer. Additionally, the response may be to send email to a system manager. If the condition is a failure on the system, the response may be to fix/correct the failure from the condition detection component. In the above login example, the response may be to alert a security personnel, shut down the agent, and/or log the user off, etc.

Figure 5:
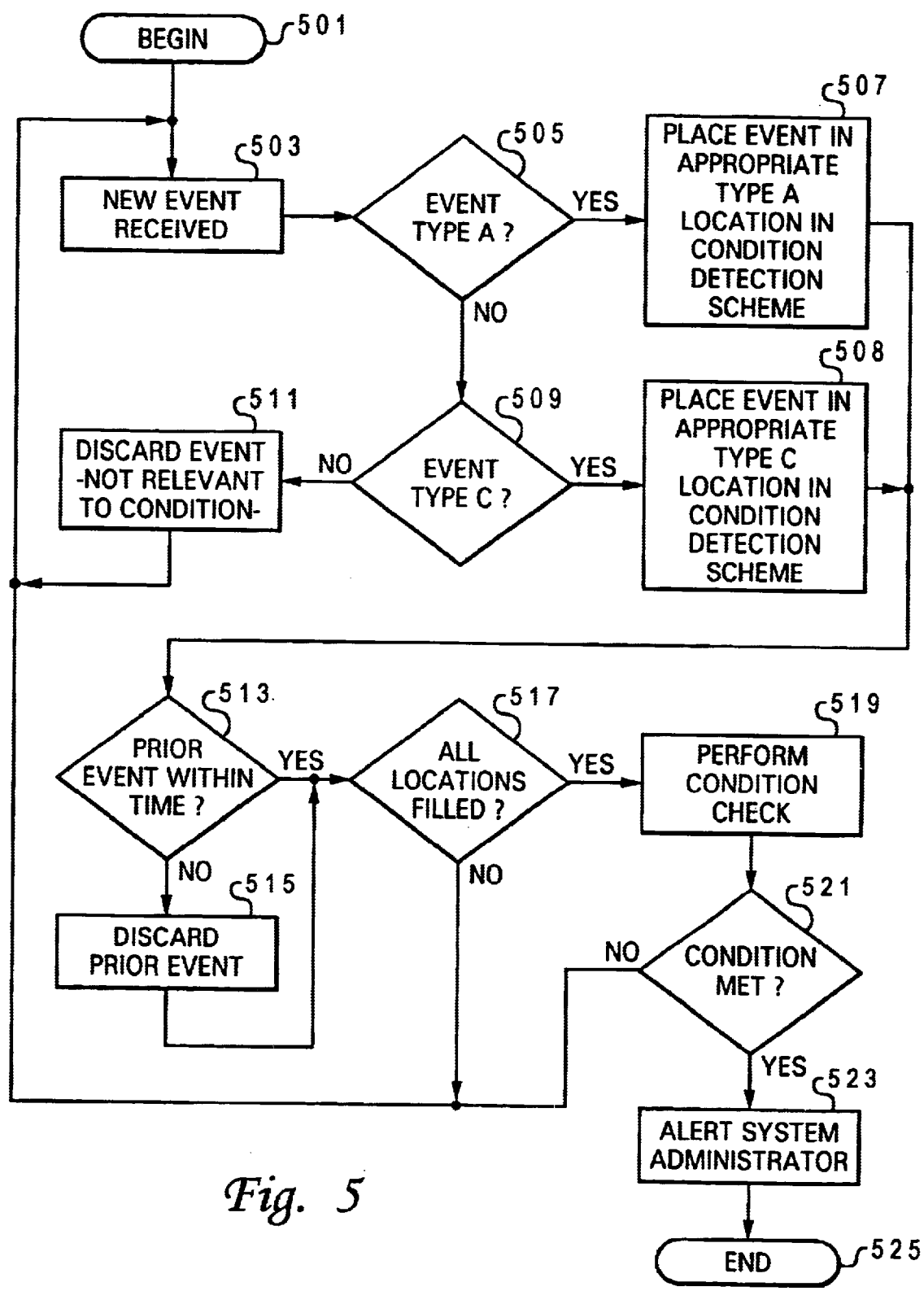
FIG. 5 is a logic flow chart of the processes of the automated condition detection mechanism according to one embodiment of the present invention.

FIG. 5 depicts the process of the condition detection in the preferred embodiment. In this embodiment, two types of events are important to the condition, type A and type C. The process begins (step 501), when a new event is received (step 503). The event is checked to determine if it is type A (step 505). If it is type A, it is added to the appropriate type A operand list in the equation. If however, it is not then it is checked to determine if it is type C (step 509). If it is not, then it is deemed to be irrelevant to the condition and discarded (step 511). If, however, it is a type C, it is added to the appropriate type C operand list in the equation. Once a correct type is recorded and placed in the appropriate operand list, a check is made to determine if the prior operands are still within the timed period (step 513). Here the timed period is the time measured from when the prior operand was placed in an operand list to the time the present operand is placed in a list. If the operand is no longer within the predefined time period, it is discarded (step 515) and all events of type A and C that were received more than five minutes before the current event was received are purged from their respective lists. Then the evaluation process begins. For each unique combination of the received event lists, the equation is evaluated for a condition match (step 519). A determination is made of whether the condition is met for any of the combinations (step 521). When the condition is detected, i.e., the equation evaluates to true, the system administrator is alerted (step 523). Then the process ends (step 525). If, however, the condition is not detected, then the process returns to monitor for the occurrence of a new event (step 513).

The invention thus presents a new approach for detecting conditions of interest in a distributed system. This approach differs from the conventional approach in that it employs direct expression evaluation as opposed to the event/attribute filters and cache search paradigm. This approach has a more precise means for specifying conditions of interest to detect and thus is easier to learn. Users familiar with the entities in the monitored system are able to directly specify the monitoring criteria based solely on their domain knowledge. Minimal knowledge of the underlying condition detection architecture is required.

The burden of developing monitoring criteria is significantly reduced because event correlation is performed implicitly by the condition detection component as opposed to explicit specification of event filters and cache searches. Finally, implementation of the condition detection component can potentially be very efficient, since the basic expression evaluation technology required is well understood.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention. For example, it is understood that although the invention has been described in terms of a conditions comprised of two event types, any number of event types may be included in the condition being monitored. Also, the effect of the meeting of the condition is not limited to providing a signal to a system administrator. Other effects are possible and may entail automated reactions to the condition met, logging of the occurrences of the condition, etc. Those skilled in the art understand that all possible variations to the disclosed embodiments fall within the scope of the invention.

What is claimed is:

1. A method for detecting conditions of interest in a distributed system, said method comprising the steps of:

formulating a condition of interest as a single Boolean statement;

storing said Boolean statement at a condition detection component of said distributed system;

attaching a WITHIN parameter to said Boolean statement wherein only an event which occurs within a time period specified by said WITHIN element may contribute to said condition;

selectively accepting events sent to said condition detection component from at least one data collection component; and evaluating said accepted events against said Boolean statement to determine if said condition is met.

2. The method of claim 1, wherein said WITHIN parameter operates as a filter and said attaching step further includes the step of creating a WITHIN window specification, wherein said condition detection point utilizes said WITHIN window specification to filter out events based on a time of occurrence.

3. The method of claim 1, wherein said condition of interest in said formulating step is one, or a combination of more than one, event which is detected by said data collection component, wherein each of said one or said combination of more than one events may have a plurality of types and/or attributes and said formulating step further includes the step of:

formulating said condition of interest based on an occurrence of a special type and/or attribute of an event.

4. The method of claim 1, wherein said condition detection point has a logic component and a memory, and said storing step includes the step of:

parsing a file containing said conditions of interest as a Boolean statement to create a program code;

storing said program code in said memory; and said accepting step utilizes said logic component to complete the steps of:

comparing all events accepted against a list of events or event types for said occurrence of said condition; and accepting only an event or event type which matches one within said list.

5. The method of claim 4, wherein further said evaluating step includes the steps of:

storing each instance of an event which satisfies a WITHIN parameter in said memory location, wherein said WITHIN parameter provides a time period during which an event may contribute to the condition being monitored;

systematically substituting each event instance for a parameter in said Boolean statement; and evaluating each combination from said substituting step to determine if said Boolean statement is satisfied.

6. The method of claim 5, wherein said storing step further includes the step of creating an operand list for each instance of a parameter in said Boolean statement, wherein each of said instance is stored in said operand list.

7. The method of claim 1, wherein said condition detection component is a remotely located data processing system.

8. The method of claim 1, wherein said condition of interest in said formulating step includes a failure within said distributed system.

9. The method of claim 1, wherein said distributed system is a heterogeneous system having more than one type of data collection component further comprising the step of:

parameterizing an event received from a data collection component into a standard event recognizable by said condition detection component.

10. The method of claim 9, wherein further:

said condition of interest in said formulating step includes an event attribute corresponding to a particular data collection component; and said evaluating step includes the step of evaluating said condition of interest utilizing said event attribute.

11. A system for detecting conditions of interest in a distributed system, said system comprising:

means for formulating a condition of interest as a single Boolean statement;

means for storing said Boolean statement at a condition detection component of said distributed system, wherein:

said condition detection component has a logic component and a memory, and said storing means includes means for parsing a file containing said conditions of interest as said Boolean statement to create a program code, and storing said program code in said memory;

means for selectively accepting events sent to said condition detection component from at least one data collection component; and means for evaluating said accepted events against said Boolean statement to determine if said condition is met.

12. The system of claim 11, said formulating means further comprises means for attaching a WITHIN parameter to said Boolean statement wherein only an event which occurs within a time period specified by said WITHIN element may contribute to said condition.

13. The system of claim 12, wherein said WITHIN parameter operates as a filter and said attaching means further includes means for creating a WITHIN window specification, wherein said condition detection component utilizes said WITHIN window specification to filter out events based on a time of occurrence.

14. The system of claim 11, wherein said condition of interest in said formulating means is one or a combination of more than one events which are detected by said data collection component, wherein each of said one or said combination of more than one events may have a plurality of types and/or attributes and said formulating means further includes means for formulating said condition of interest based on an occurrence of a special type and/or attribute of an event.

15. The system of claim 11, wherein:

said accepting means utilizes said logic component to provide means for comparing all events accepted against a list of events or event types for said occurrence of said condition, and accepting only an event or event type which matches one within said list.

16. The system of claim 15, wherein further said evaluating means includes:

means for storing each instance of an event which satisfies a WITHIN parameter in said memory location, wherein said WITHIN parameter provides a time period during which an event may contribute to the condition being monitored;

means for systematically substituting each event instance for a parameter in said Boolean statement; and means for evaluating each combination from said substituting means to determine if said Boolean statement is satisfied.

17. The system of claim 16, wherein said storing means further includes means for creating an operand list for each instance of a parameter in said Boolean statement, wherein each of said instance is stored in said operand list.

18. The system of claim 11, wherein said condition detection is a remotely located data processing system.

19. The system of claim 11, wherein said condition of interest in said formulating means includes a failure within said distributed system.

20. The system of claim 11, wherein said distributed system is a heterogeneous system having more than one type of data collection component, said system further comprising:

means for parameterizing an event received from a data collection component into a standard event recognizable by said condition detection component.

21. The system of claim 20, wherein further:

said condition of interest in said formulating means includes an event attribute corresponding to a particular data collection component; and said evaluating means includes means for evaluating said condition of interest utilizing said event attribute.

22. A computer program product for detecting conditions of interest in a distributed system, said computer program product comprising:

a computer readable storage medium; and program instructions on said computer readable storage medium for:

formulating a condition of interest as a single Boolean statement;

attaching a WITHIN parameter to said Boolean statement wherein only an event which occurs within a time period specified by said WITHIN element may contribute to said condition;

storing said Boolean statement at a condition detection component of said distributed system;

selectively accepting events sent to said condition detection component from at least one data collection component; and evaluating said accepted events against said Boolean statement to determine if said condition is met.

23. The computer program product of claim 22, wherein said WITHIN parameter operates as a filter and said program instructions for said attaching step further includes program instructions for creating a WITHIN window specification, wherein said condition detection component utilizes said WITHIN window specification to filter out events based on a time of occurrence.

24. The computer program product of claim 22, wherein said condition of interest in said formulating step is one or a combination of more than one events which are detected by said data collection component, wherein each of said one or said combination of more than one events may have a plurality of types and/or attributes and said program instructions for said formulating step further includes program instructions for formulating said condition of interest based on an occurrence of a special type and/or attribute of an event.

25. The computer program product of claim 22, wherein said condition detection point has a logic component and a memory and wherein further:

said program instructions for said storing step includes program instructions for parsing a file containing said conditions of interest as a Boolean statement to create a program code, and storing said program code in said memory; and said program instructions for said accepting step includes instructions for comparing all events accepted against a list of events or event types for said occurrence of said condition, and accepting only an event or event type which matches one within said list.

26. The computer program product of claim 25, wherein further said program instructions for said evaluating step includes:

program instructions for storing each instance of an event which satisfies a WITHIN parameter in said memory location, wherein said WITHIN parameter provides a time period during which an event may contribute to the condition being monitored;

program instructions for systematically substituting each event instance for a parameter in said Boolean statement; and program instructions for evaluating each combination from said substituting step to determine if said Boolean statement is satisfied.

27. The computer program product of claim 26, wherein said program instructions for said storing step further includes program instructions for creating an operand list for each instance of a parameter in said Boolean statement, wherein each of said instance is stored in said operand list.

28. The computer program product of claim 22, wherein said condition detection component is a remotely located data processing system.

29. The computer program product of claim 22, wherein said condition of interest in said program instructions for said formulating includes a failure within said distributed system.

30. The computer program product of claim 22, wherein said distributed system is a heterogeneous system having more than one type of data collection component further comprising:

program instructions for parameterizing an event received from a data collection component into a standard event recognizable by said condition detection component.

31. The computer program product of claim 30, wherein further:

said condition of interest in said program instructions for said formulating a step includes an event attribute corresponding to a particular data collection component; and said program instructions for said evaluating step includes:

program instructions for evaluating said condition of interest utilizing said event attribute.

\* \* \* \* \*